US012619838B2

(12) United States Patent
Woodworth et al.

(10) Patent No.: US 12,619,838 B2
(45) Date of Patent: May 5, 2026

(54) SYSTEMS AND METHODS FOR VERIFYING REMOTE DEVICE PROXIMITY IN RFID SYSTEMS

(71) Applicant: CenturyLink Intellectual Property LLC, Denver, CO (US)

(72) Inventors: John R.B. Woodworth, Amissville, VA (US); Dean Ballew, Sterling, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 61 days.

(21) Appl. No.: 18/972,153

(22) Filed: Dec. 6, 2024

(65) Prior Publication Data

US 2025/0190725 A1     Jun. 12, 2025

Related U.S. Application Data

(60) Provisional application No. 63/609,003, filed on Dec. 12, 2023.

(51) Int. Cl.
G06K 7/10     (2006.01)
B60R 25/20     (2013.01)
G06F 21/55     (2013.01)

(52) U.S. Cl.
CPC ....... G06K 7/10257 (2013.01); G06F 21/554 (2013.01); B60R 25/2072 (2013.01); B60R 2325/105 (2013.01); G06F 2221/034 (2013.01)

(58) Field of Classification Search
CPC .............. G06K 7/10257; G06F 21/554; G06F 2221/034; B60R 25/2072; B60R 2325/105
See application file for complete search history.

(56) References Cited

U.S. PATENT DOCUMENTS

| | | | |
|---|---|---|---|
| 2005/0287991 A1* | 12/2005 | Shima ..................... | G06F 21/10 455/411 |
| 2007/0058559 A1* | 3/2007 | Xu ....................... | H04L 63/0492 370/252 |
| 2009/0217037 A1* | 8/2009 | Courtay .............. | H04L 63/0869 713/168 |
| 2012/0163353 A1* | 6/2012 | Cordeiro ............ | H04N 21/4367 370/338 |
| 2014/0013397 A1* | 1/2014 | Nakano ................... | H04L 63/08 726/4 |
| 2015/0040210 A1* | 2/2015 | Faaborg .................. | G06F 21/34 726/16 |
| 2015/0127947 A1* | 5/2015 | Nakano ................ | H04L 63/061 713/171 |

(Continued)

*Primary Examiner* — Darren B Schwartz

(57)     ABSTRACT

Systems and methods for verifying remote device proximity in RFID systems are described. To reduce the risk of relay attacks, a terminal may determine a distance of a remote device from the terminal. The terminal may send a computational challenge to the remote device and determine whether a latency of the response is within a maximum acceptable latency, indicating that the remote device is within a maximum acceptable distance. The maximum acceptable latency may be dynamically determined based on context information, such as a time of day, that may be correlated with a likelihood of attempted unauthorized accesses. The terminal may determine whether to perform an action associated with the remote device based on whether the response was received within the maximum acceptable latency.

18 Claims, 5 Drawing Sheets

(56)                 References Cited

U.S. PATENT DOCUMENTS

| | | | |
|---|---|---|---|
| 2015/0237067 A1* | 8/2015 | Talyansky | H04L 69/28 |
| | | | 726/23 |
| 2016/0352605 A1* | 12/2016 | O'Donoghue | H04L 9/0838 |
| 2017/0318008 A1* | 11/2017 | Mead | H04L 63/083 |
| 2018/0114001 A1* | 4/2018 | Jain | H04L 63/083 |
| 2018/0265040 A1* | 9/2018 | Nowottnick | B60R 25/24 |
| 2019/0075461 A1* | 3/2019 | Sun | H04L 9/3226 |
| 2020/0177569 A1* | 6/2020 | Kleeberger | H04L 63/1458 |
| 2020/0204374 A1* | 6/2020 | Skertic | H04L 9/0637 |
| 2020/0264297 A1* | 8/2020 | El Soussi | H04W 12/12 |
| 2021/0001806 A1* | 1/2021 | Kim | B60R 25/24 |
| 2021/0203670 A1* | 7/2021 | Woodland | G06F 21/725 |
| 2022/0046415 A1* | 2/2022 | Chiang | H04L 63/0853 |
| 2022/0191247 A1* | 6/2022 | Dhoble | H04L 63/20 |
| 2022/0292901 A1* | 9/2022 | Cimino | H04W 12/63 |
| 2022/0355763 A1* | 11/2022 | Patne | H04W 4/38 |
| 2022/0360453 A1* | 11/2022 | Sun | H04W 4/38 |
| 2023/0339431 A1* | 10/2023 | Kuehner | B60R 25/305 |
| 2024/0242223 A1* | 7/2024 | Loncaric | H04L 63/08 |
| 2024/0291863 A1* | 8/2024 | Cohen | H04L 63/1491 |

* cited by examiner

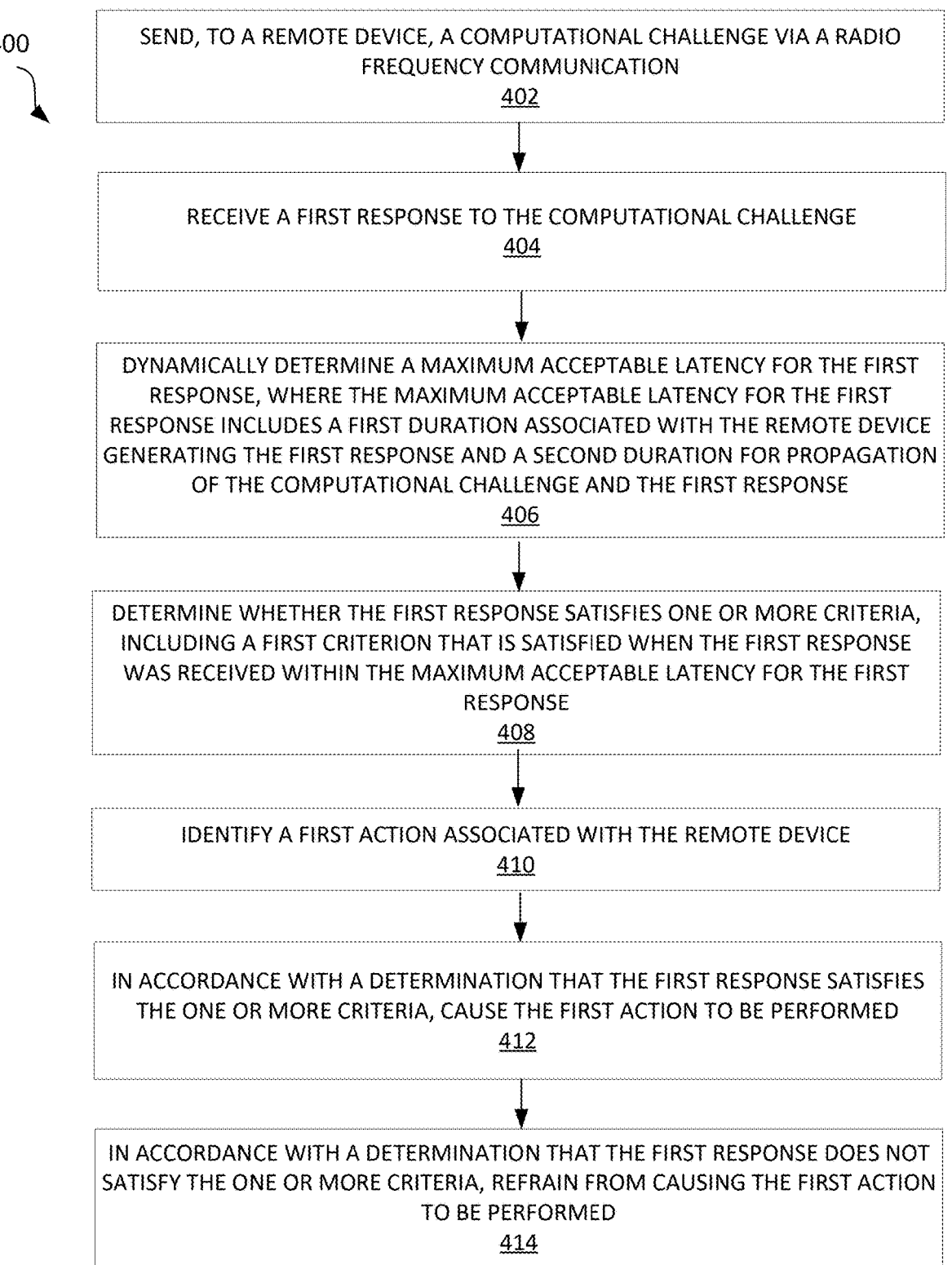

400

SEND, TO A REMOTE DEVICE, A COMPUTATIONAL CHALLENGE VIA A RADIO FREQUENCY COMMUNICATION
402

RECEIVE A FIRST RESPONSE TO THE COMPUTATIONAL CHALLENGE
404

DYNAMICALLY DETERMINE A MAXIMUM ACCEPTABLE LATENCY FOR THE FIRST RESPONSE, WHERE THE MAXIMUM ACCEPTABLE LATENCY FOR THE FIRST RESPONSE INCLUDES A FIRST DURATION ASSOCIATED WITH THE REMOTE DEVICE GENERATING THE FIRST RESPONSE AND A SECOND DURATION FOR PROPAGATION OF THE COMPUTATIONAL CHALLENGE AND THE FIRST RESPONSE
406

DETERMINE WHETHER THE FIRST RESPONSE SATISFIES ONE OR MORE CRITERIA, INCLUDING A FIRST CRITERION THAT IS SATISFIED WHEN THE FIRST RESPONSE WAS RECEIVED WITHIN THE MAXIMUM ACCEPTABLE LATENCY FOR THE FIRST RESPONSE
408

IDENTIFY A FIRST ACTION ASSOCIATED WITH THE REMOTE DEVICE
410

IN ACCORDANCE WITH A DETERMINATION THAT THE FIRST RESPONSE SATISFIES THE ONE OR MORE CRITERIA, CAUSE THE FIRST ACTION TO BE PERFORMED
412

IN ACCORDANCE WITH A DETERMINATION THAT THE FIRST RESPONSE DOES NOT SATISFY THE ONE OR MORE CRITERIA, REFRAIN FROM CAUSING THE FIRST ACTION TO BE PERFORMED
414

Fig. 4

SYSTEMS AND METHODS FOR VERIFYING REMOTE DEVICE PROXIMITY IN RFID SYSTEMS

CROSS-REFERENCE TO RELATED APPLICATIONS

This application claims the benefit of U.S. Provisional Application No. 63/609,003 filed Dec. 12, 2023, entitled "Systems and Methods for Verifying Remote Device Proximity in RFID Systems," which is incorporated herein by reference in its entirety.

BACKGROUND

Some automotive key fobs are vulnerable to relay attacks in which attackers relay and amplify radio frequency (RF) signals exchanged between the fob and the corresponding vehicle to obtain unauthorized access to the vehicle. Relay attacks can also be used on other types of systems that rely on authentication using RF signals, such as credit cards that use near-field communication (NFC). It is with respect to this general technical environment that aspects of the present disclosure are directed.

SUMMARY

The present application describes a method including: sending, to a remote device, a computational challenge via radio frequency communication; receiving a first response to the computational challenge; dynamically determining a maximum acceptable latency for the first response, where the maximum acceptable latency includes a first duration associated with the remote device generating the first response and a second duration for propagation of the computational challenge and the first response; determining whether the first response satisfies one or more criteria, including a first criterion that is satisfied when the first response was received within the maximum acceptable latency for the first response; identifying an action associated with the remote device; in accordance with a determination that the first response satisfies the one or more criteria, causing the action to be performed; and in accordance with a determination that the first response does not satisfy the one or more criteria, refraining from causing the action to be performed.

In some examples, and in combination with any of the above aspects and examples, the method further includes receiving a first action request from the remote device, where the first action is identified based on the first action request.

In some examples, and in combination with any of the above aspects and examples, the first action is identified based on the first response.

In some examples, and in combination with any of the above aspects and examples, the one or more criteria include a second criterion that is satisfied when the first response was received after a minimum acceptable latency corresponding to the first duration for solving the computational challenge.

In some examples, and in combination with any of the above aspects and examples, the one or more criteria include a third criterion that is satisfied when the first response is successfully authenticated.

In some examples, and in combination with any of the above aspects and examples, dynamically determining the maximum acceptable latency for the first response includes determining the second duration based on context information.

In some examples, and in combination with any of the above aspects and examples, the context information includes a location of an electronic device associated with a registered user, a time of day, a calendar entry associated with the registered user, a usage pattern associated with the remote device, or a combination of these.

In some examples, and in combination with any of the above aspects and examples, dynamically determining the maximum acceptable latency for the first response includes dynamically determining the second duration based on a configuration setting of a maximum acceptable distance between a terminal and the remote device.

In some examples, and in combination with any of the above aspects and examples, dynamically determining the maximum acceptable latency for the first response includes selecting the second duration based on a current time of day.

In some examples, and in combination with any of the above aspects and examples, dynamically determining the maximum acceptable latency for the first response includes retrieving the maximum acceptable latency, the first duration, the second duration, or a combination of these from a storage element.

In some examples, and in combination with any of the above aspects and examples, the method further includes: sending, to the remote device, a second computational challenge via radio frequency communication; receiving a second response to the second computational challenge; dynamically determining a maximum acceptable latency for the second response, where the maximum acceptable latency for the second response is different from the maximum acceptable latency for the first response; determining whether the second response satisfies the one or more second criteria, including a criterion that is satisfied when the second response is received within the maximum acceptable latency for the second response; identifying a second action associated with the remote device; in accordance with a determination that the second response satisfies the one or more second criteria, causing the second action to be performed; and in accordance with a determination that the second response does not satisfy the one or more second criteria, refraining from causing the second action to be performed.

In other aspects, the present application describes a system that includes: at least one processor; and memory, operatively connected to the at least one processor and storing instructions that, when executed by the at least one processor, cause the system to perform a method. In examples, the method includes: sending, to a remote device, a computational challenge via radio frequency communication; receiving a first response to the computational challenge; dynamically determining a maximum acceptable latency for the first response, wherein the maximum acceptable latency for the first response comprises a first duration associated with the remote device generating the first response and a second duration for propagation of the computational challenge and the first response; determining whether the first response satisfies one or more criteria, including a first criterion that is satisfied when the first response was received within the maximum acceptable latency for the first response; identifying a first action associated with the remote device; in accordance with a determination that the first response satisfies the one or more criteria, causing the first action to be performed; and in accordance with a determination that the first response does not satisfy the one or more criteria, refraining from causing the first action to be performed.

In some examples, and in combination with any of the above aspects and examples, the method further includes receiving a first action request from the remote device, where the first action is identified based on the first action request.

In some examples, and in combination with any of the above aspects and examples, the first action is identified based on the first response.

In some examples, and in combination with any of the above aspects and examples, the one or more criteria include a second criterion that is satisfied when the first response was received after a minimum acceptable latency corresponding to the first duration for solving the computational challenge.

In some examples, and in combination with any of the above aspects and examples, the one or more criteria include a third criterion that is satisfied when the first response is successfully authenticated.

In some examples, and in combination with any of the above aspects and examples, dynamically determining the maximum acceptable latency for the first response includes determining the second duration based on context information.

In some examples, and in combination with any of the above aspects and examples, the context information includes a location of an electronic device associated with a registered user, a time of day, a calendar entry associated with the registered user, a usage pattern associated with the remote device, or a combination of these.

In some examples, and in combination with any of the above aspects and examples, dynamically determining the maximum acceptable latency for the first response includes dynamically determining the second duration based on a configuration setting of a maximum acceptable distance between a terminal and the remote device.

In some examples, and in combination with any of the above aspects and examples, dynamically determining the maximum acceptable latency for the first response includes selecting the second duration based on a current time of day.

In some examples, and in combination with any of the above aspects and examples, dynamically determining the maximum acceptable latency for the first response includes retrieving the maximum acceptable latency, the first duration, the second duration, or a combination of these from a storage element.

In some examples, and in combination with any of the above aspects and examples, the method further includes: sending, to the remote device, a second computational challenge via radio frequency communication; receiving a second response to the second computational challenge; dynamically determining a maximum acceptable latency for the second response, where the maximum acceptable latency for the second response is different from the maximum acceptable latency for the first response; determining whether the second response satisfies one or more second criteria, including a criterion that is satisfied when the second response was received within the maximum acceptable latency for the second response; identifying a second action associated with the remote device; in accordance with a determination that the second response satisfies the one or more second criteria, causing the second action to be performed; and in accordance with a determination that the second response does not satisfy the one or more second criteria, refraining from causing the second action to be performed.

In other aspects, the present application describes a method including: sending, to a remote device, a computational challenge via radio frequency communication; receiving a response to the computational challenge; dynamically determining a maximum acceptable latency for the response based on context information; determining whether the response satisfies one or more criteria, including a first criterion that is satisfied when the response was received within the maximum acceptable latency; identifying an action associated with the remote device; in accordance with a determination that the response satisfies the one or more criteria, causing the action to be performed; and in accordance with a determination that the response does not satisfy the one or more criteria, refraining from causing the action to be performed.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

FIG. 4 is an example method for verifying remote device proximity in RFID systems according to aspects of the present application.

DETAILED DESCRIPTION

Vehicles with electronic key fobs typically rely on radio frequency identification (RFID) to ensure that a particular fob only works with a particular vehicle. Some key fobs are vulnerable to relay attacks, however, in which one or more attackers (typically two) relay and amplify RF signals exchanged between the fob and the corresponding vehicle to obtain unauthorized control of the vehicle.

Figure 1A:
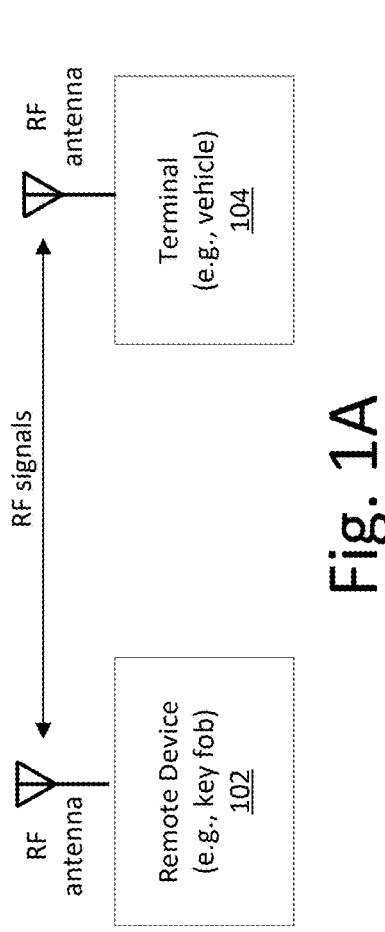
FIGS. 1A-1B depict systems for communicating radio frequency signals between a terminal and a remote device.

FIG. 1A depicts an example of an RFID-based system that includes a remote device 102 and a terminal 104. The terminal 104 may be, for example, a computing system in a vehicle that is configured to exchange RF signals with the remote device 102, which may be a key fob. The terminal 104 and remote device 102 each includes an RF antenna for exchanging RF signals, along with processing circuitry to generate and process such signals. For example, a terminal 104 of a vehicle may periodically transmit a query signal to determine whether a remote device 102 is within range (e.g., close enough to the vehicle to receive the transmitted query signal and respond). In some cases, if the terminal 104 receives a response from the remote device 102, the terminal 104 performs an authentication procedure to determine whether the remote device 102 is authorized to communicate with the terminal 104. For example, the terminal 104 may determine whether a signal received from the remote device 102 includes appropriate authentication information (such as by including a code that is matched to a corresponding code stored at the terminal 104 or using another authentication approach). In some cases, the terminal 104 transmits a computational challenge to the remote device 102 (e.g., a seed value for a hash function or another value that may be used by the remote device 102 to generate (e.g., compute) a response using an algorithm stored on the remote device 102. If the remote device 102 responds with an appropriate response, the terminal 104 authenticates the remote device 102. In some cases, a terminal 104 may perform an action at least in part in response to receiving an authenticated signal from a remote device 102. For example, a vehicle may automatically unlock its doors at least in part in response to detecting an authenticated signal from a key fob.

In some cases, a remote device 102 transmits signals to a terminal 104 without an explicit user input; for example, a key fob may automatically (without user input) transmit a response signal to a vehicle in response to receiving a query signal (or challenge) from the vehicle, and the vehicle may, in turn, authenticate the response signal and unlock the doors of the vehicle in response to receiving an authenticated signal from the key fob. In this manner, the vehicle may automatically unlock its doors (or allow them to be unlocked using a physical button on the vehicle, for example) when it detects that an authenticated key fob is nearby.

Figure 1B:
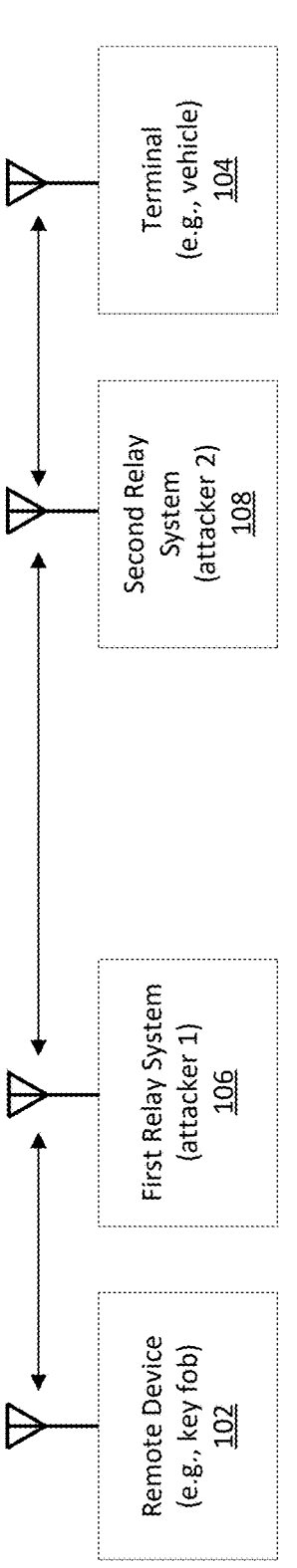

Such RFID-based systems may be vulnerable to malicious relay attacks, however, such as depicted in FIG. 1B. In a relay attack, a first relay system 106 (e.g., an electronic system carried by a first attacker) may be positioned in close proximity to the remote device 102 and a second relay system 108 (e.g., an electronic system carried by a second attacker) may be positioned close to the terminal 104. RF signals transmitted by the terminal 104 may be captured, amplified, and relayed to the remote device 102 using the first relay system 106 and second relay system 108, and vice versa. In this case, the terminal 104 may mistakenly determine (based on relayed signals) that the remote device 102 is in close proximity to the terminal 104 even when the remote device 102 is relatively far away. For example, a vehicle may mistakenly determine that a key fob is nearby when the key fob is not nearby, and the vehicle may respond by unlocking its doors (or taking some other action, such as starting its engine), allowing an attacker to gain access to the vehicle. Such communications may occur between the remote device 102 and the terminal 104 (via the relay systems) without a user of the remote device 102 being aware that they are occurring.

Other types of remote device/terminal combinations may be susceptible to such attacks. For example, similar relay attacks can be used to relay signals between a payment terminal and an RFID-equipped payment card (e.g., a credit card that uses near-field RF signals to provide payment information to a payment terminal).

As described herein, systems and methods for preventing relay attacks in RFID systems can be used to determine whether a remote device (such as a key fob or credit card) is in close physical proximity to a terminal (such as a terminal in a vehicle or a payment terminal) based on a configurable maximum acceptable latency for communications between the terminal and the remote device.

In some examples, the remote device is provided with (e.g., programmed with) an algorithm that can be used by the remote device to generate a response to a computational challenge that is received from a terminal. In some examples, an amount of time required by the remote device to generate a response (e.g., a time duration required by the remote device to perform the algorithm) is determined (e.g., by the remote device itself, by the terminal, or by another computing device) and provided to the terminal. The time duration required by the remote device to compute the response may vary between remote devices and may be based on the specific computational circuitry included in the remote device. Thus, this time duration may be device specific.

In some examples, the terminal can determine a distance of the remote device from the terminal (e.g., a proximity) based on a latency between when the terminal transmits a challenge and when the terminal receives a response. This latency includes a computational latency required by the remote device to compute a response to the challenge (a latency which is known to the terminal) plus the round-trip communication latency (e.g., a latency that includes a time duration associated with the challenge being propagated to the remote device and a time duration associated with the response being propagated from the remote device to the terminal). For example, the terminal can determine the distance of the remote device from the terminal by determining (e.g., measuring) the total latency between transmitting a challenge and receiving a response, subtracting the computational latency to determine the communication latency, and using the communication latency to determine the distance of the remote device based on known or estimated RF signal propagation speeds.

Conversely, given a maximum acceptable distance between the remote device and the terminal, a maximum acceptable latency can be determined. In some examples, the maximum acceptable latency corresponds to an expected latency when the remote device is physically located at a threshold distance (e.g., a maximum acceptable distance) from the terminal. In some examples, if the measured latency is within (e.g., less than or equal to) the maximum acceptable latency, the remote device is determined, by the terminal, to be within the maximum acceptable distance, indicating that signals received from the remote device are unlikely to be attacker-relayed signals (which would have longer communication latencies).

In some examples, if the terminal receives a response within the maximum acceptable latency (and if the response is successfully authenticated), the terminal performs an action associated with the remote device. In some examples, if the terminal does not receive a response within the maximum acceptable latency (e.g., the latency of the response exceeds the maximum acceptable latency), the terminal refrains from performing the action.

In some examples, the maximum acceptable latency is a constant value that is based on a constant maximum acceptable distance. For example, the maximum acceptable latency may be calculated based on having a constant maximum acceptable distance of five feet, such that the terminal does not respond to action requests received from the remote device if the terminal determines that the remote device is more than five feet away.

In some examples, the maximum acceptable latency is configurable. For example, a user of the terminal can configure the maximum acceptable latency (e.g., based on a maximum acceptable distance) via a configuration setting that is provided to the terminal.

In some examples, the maximum acceptable latency is a variable whose value varies over time and is dynamically determined, by the terminal or by another computing device that is configured to communicate with the terminal, based on context information that may be correlated with a likelihood of unauthorized access attempts. For example, the maximum acceptable latency may be determined to be a first value (e.g., corresponding to a distance of 10 feet) from 5 am to 11 pm and a second value (e.g., corresponding to a distance of 3 feet) from 11 pm to 5 am, reflecting a higher likelihood of unauthorized access attempts at night. In some examples, an artificial intelligence and/or machine learning system may determine the maximum acceptable latency based on other context information, such as usage patterns associated with the remote device and/or other behavior patterns associated with a user of the remote device. In some examples, the maximum acceptable latency is determined dynamically in response to a request by the terminal 104, such as depicted in FIG. 2.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems, or devices. Accordingly, examples may take the form of a hardware implementation, an entirely software implementation, or an implementation combining software and hardware aspects. In addition, all systems described with respect to the figures can comprise one or more machines or devices that are operatively connected to cooperate in order to provide the described system functionality. The following detailed description is therefore not to be taken in a limiting sense, and the scope of the present disclosure is defined by the appended claims and their equivalents.

Additional details regarding methods and systems that can be used to implement aspects of the above-described features is described with reference to FIGS. 2-5.

Figure 2:
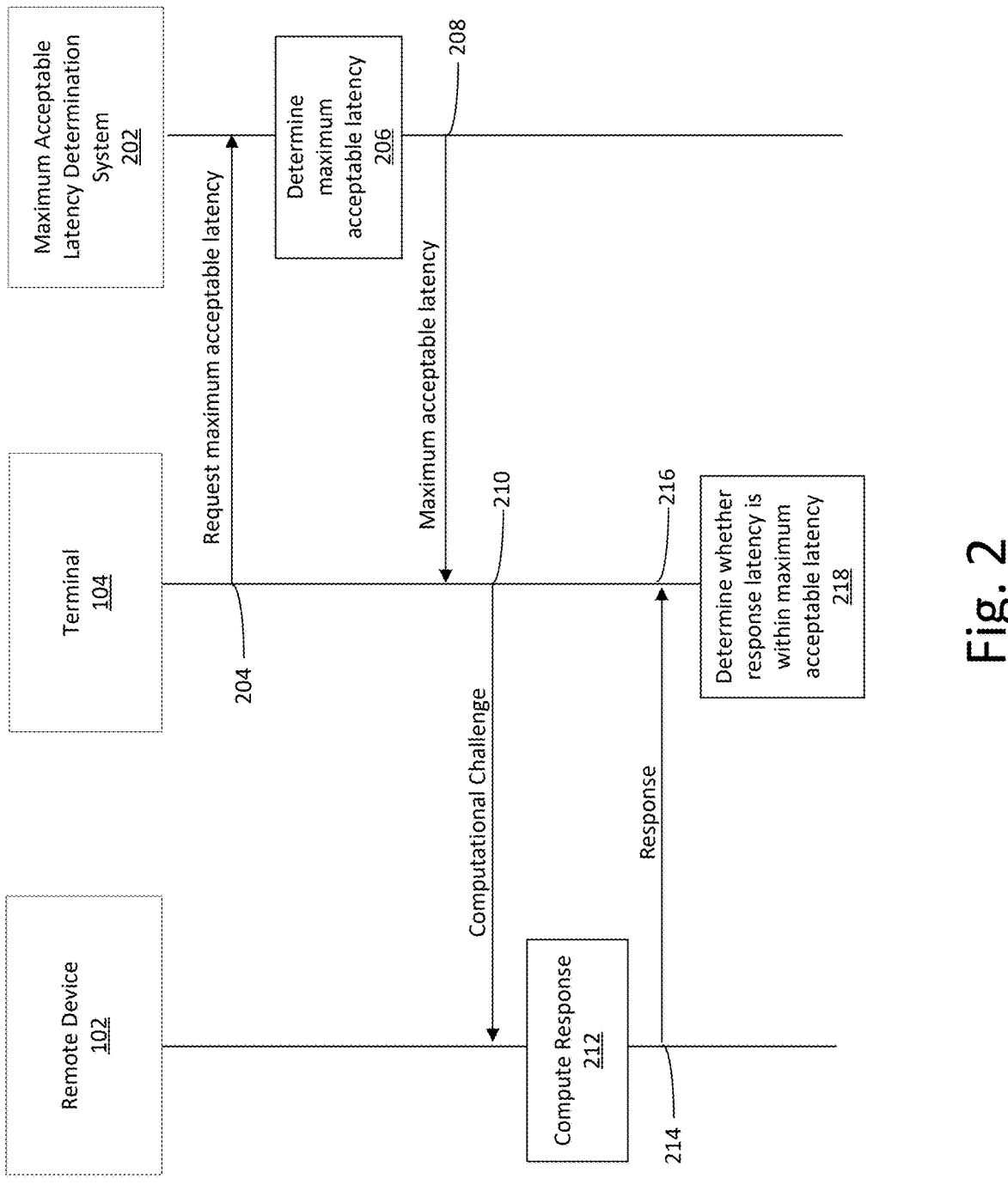
FIG. 2 depicts a swim-lane diagram for verifying remote device proximity in RFID systems according to aspects of the present application.

FIG. 2 depicts a swim-lane diagram showing example communications between a terminal 104, a remote device 102, and a maximum acceptable latency determination system 202. In some examples, the maximum acceptable latency determination system 202 is included in the terminal 104. In some examples, the maximum acceptable latency determination system 202 is external to the terminal 104 and is configured to communicate with the terminal 104. In some examples, the maximum acceptable latency determination system 202 includes a computing device for determining the maximum acceptable latency, such as computing device 500 depicted in FIG. 5.

At operation 204, the terminal 104 requests a maximum acceptable latency value from the maximum acceptable latency determination system 202. For example, the terminal 104 may request the value in preparation for sending a challenge to the remote device 102, at initialization or startup, or at another time.

In some examples, in response to receiving the request from the terminal 104, the maximum acceptable latency determination system 202 determines, at operation 206, a maximum acceptable latency between a time at which the terminal 104 transmits a challenge to a remote device 102 and the time at which the terminal 104 receives a response from the remote device 102.

The maximum acceptable latency determination system 202 may determine the maximum acceptable latency based on a variety of context information obtained from internal and/or external sources, such as described with reference to FIG. 3. The maximum acceptable latency determination system 202 may dynamically determine the maximum acceptable latency based on a probability of legitimate usage of the remote device. For example, the maximum acceptable latency determination system 202 may determine that there is a low probability of the user legitimately using the remote device based on context information indicating that it is 4:00 a.m.; that the user's phone is in a different city than the terminal (e.g., as indicated by the phone's GPS location and the terminal's current GPS location) along with historical context information for the remote device indicates that the user's phone is typically located near the remote device when a legitimate response is received from the remote device; that historic context information for the remote device 102 indicates that the user very rarely uses the vehicle at this time of day; and/or that the user's home security system has not detected any motion within the user's home. A person of skill in the art will appreciate that there are many potential indications of the probability of legitimate usage of the remote device based on various types of context information and combinations of such context information.

In some examples, the maximum acceptable latency determination system 202 sets the maximum acceptable latency to a relatively low value (representing a relatively small acceptable distance between the remote device 102 and the terminal 104, such as 0, 1, 2, 5, 10, or 15 feet) based on a determination that there is a low probability of legitimate usage of the remote device. In some examples, in response to a determination that there is a low probability of legitimate usage of the remote device, the maximum acceptable latency determination system 202 sets the maximum acceptable latency to zero or to a value that requires the remote device 102 to be located inside the vehicle, thereby essentially disabling actions that the terminal would otherwise cause to be performed based on the proximity of the remote device 102 outside of the vehicle. In this case, a user may still be able to use other features that are initiated at the remote device 102, such as by pressing an unlock button.

At operation 208, the maximum acceptable latency determination system 202 provides the maximum acceptable latency (e.g., the latency determined at operation 206) to the terminal 104.

At operation 210, the terminal 104 transmits a computational challenge to the remote device 102. The computational challenge may include a value for use in an algorithm stored on the remote device 102, for example. In some examples, operations 204, 206, 208 could be performed following the issuance of the computational challenge at operation 210.

At operation 212, the remote device generates a response to the computational challenge, such as by using a value received in the computational challenge to compute a response using an algorithm stored on the remote device 102.

At operation 214, the remote device transmits the response to the terminal 104, which is received by the terminal 104 at operation 216.

At operation 218, the terminal determines whether the response latency (e.g., the elapsed time between operation 210 and operation 216) is within (e.g., less than or equal to) the maximum acceptable latency received from the maximum acceptable latency determination system 202. The terminal 104 can then use this determination to determine whether to cause an action associated with the terminal to be performed (e.g., unlocking vehicle doors, processing a payment, or other action). In some examples, the terminal 104 also performs an authentication procedure on the response to authenticate the response (e.g., to determine whether the response matches an expected response). In some examples, the terminal determines whether to cause the action to be performed based on whether the terminal is able to successfully authenticate the response and to determine that the response latency is within the maximum acceptable latency.

Figure 3:
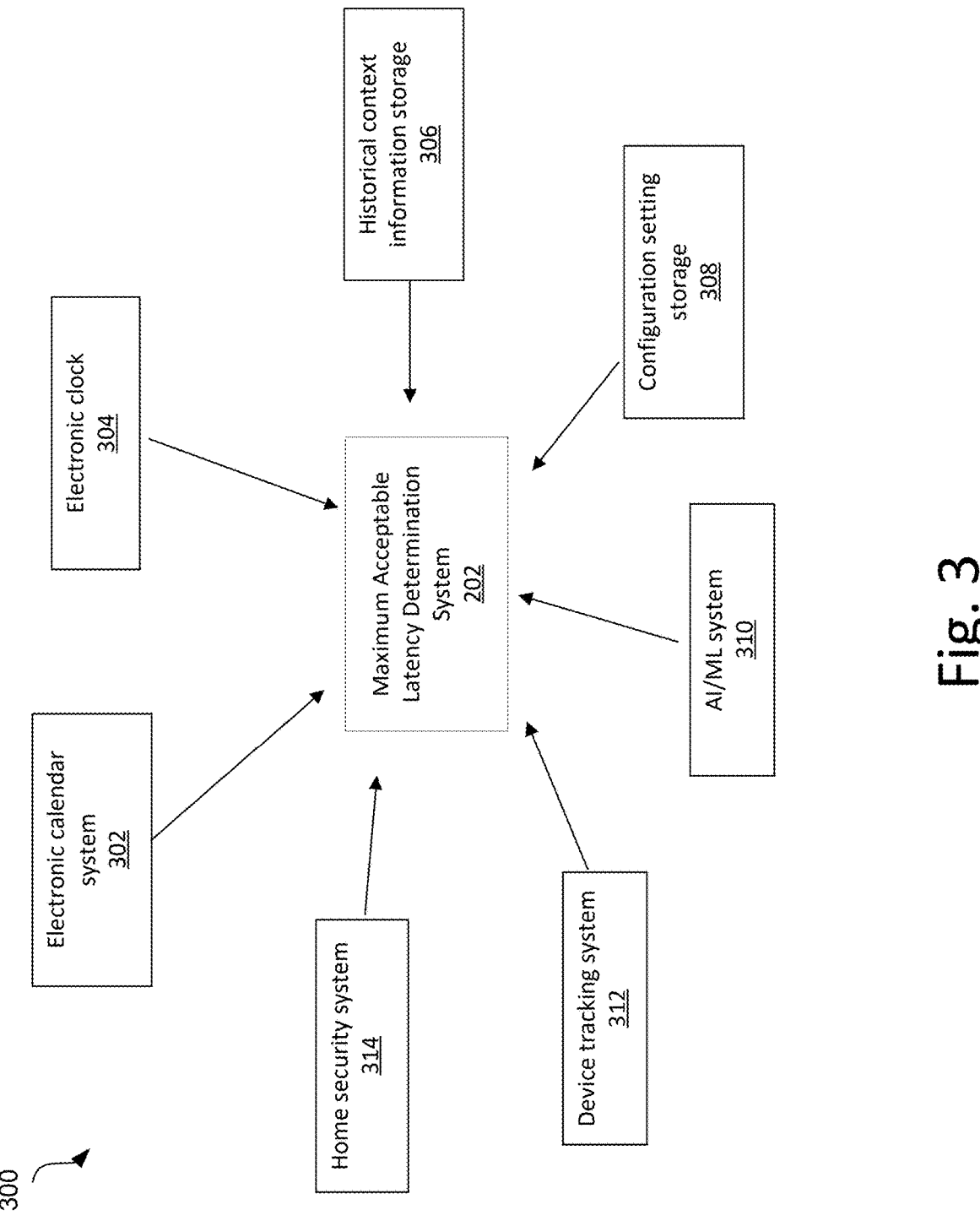
FIG. 3 depicts a system for verifying remote device proximity in RFID systems according to aspects of the present application.

FIG. 3 depicts a system 300 may be used for verifying remote device proximity in RFID systems. System 300 includes a maximum acceptable latency determination system 202 as described with reference to FIG. 2, and various example sources that may be communicatively connected with (and/or included in) the maximum acceptable latency determination system 202 to provide context information to the maximum acceptable latency determination system 202.

For example, the maximum acceptable latency determination system 202 may determine the maximum acceptable latency based on one or more of the following: event information received from an electronic calendar system 302, such as appointment information received from an electronic calendar system that may be installed on an electronic device of a registered user of the terminal (e.g., a laptop, cell phone, tablet, or other electronic device); a date and/or time received from an electronic clock 304; historical context information (such as usage patterns associated with the terminal and/or with the remote device) received from historical context information storage 306 (e.g., local or remote storage accessible by the maximum acceptable latency determination system 202 that is used to store the historical context information); user configuration settings (such as one or more maximum acceptable distances configured by a user of the terminal via a user interface) received from configuration setting storage 308 (e.g., local or remote storage accessible by the maximum acceptable latency determination system 202); information received from an artificial intelligence (AI) or machine learning (ML) system 310, such as a probability of the user legitimately using the remote device; a location (e.g., a GPS location) of an electronic device (e.g., a laptop, phone, tablet, or other electronic device) of the registered user received from a device tracking system 312; and/or motion information received from a home security system 314, such as information indicating that the home security system 314 has detected motion inside or outside of the user's home.

As previously discussed, the maximum acceptable latency determination system 202 may use context received from one or more of the sources depicted in FIG. 3 to determine maximum acceptable latencies. It should be understood that additional and/or alternative sources of context information may be used without departing from the scope of the disclosure.

FIG. 4 depicts an example method 400 according to aspects of the present application. In examples, one or more of the operations of FIG. 4 can be performed by a terminal (e.g., terminal 104) that includes a computing device, such as computing device 500 shown in FIG. 5. In other examples, some or all of the operations described below as being performed by the terminal may be performed by the remote device, and some or all of the operations described as being performed by the remote device may be performed by the terminal.

At operation 402, the terminal sends, to a remote device (e.g., remote device 102), a computational challenge via a radio frequency communication. For example, the terminal sends a value that may be used by the remote device to generate a response based on the value, using an algorithm stored on the remote device.

At operation 404, the terminal receives a first response to the computational challenge (e.g., via a radio frequency communication). The first response may be received from the remote device (e.g., during normal operation) or from a relay system of an attacker (e.g., when a relay attack is in progress).

At operation 406, the terminal dynamically determines a maximum acceptable latency for the first response, where the maximum acceptable latency for the first response includes a first duration associated with the remote device generating the first response and a second duration for the propagation of the computational challenge and the first response. In some examples, the terminal dynamically determines the maximum acceptable latency for the first response (and/or the second duration) based on context information received from one or more internal and/or external sources, such as depicted in FIG. 3. In some examples, the terminal dynamically determines the maximum acceptable latency for the first response by requesting the maximum acceptable latency from a maximum acceptable latency determination system (e.g., maximum acceptable latency determination system 202) and receiving the maximum acceptable latency from the maximum acceptable latency determination system.

At operation 408, the terminal determines whether the first response satisfies one or more criteria, including a first criterion that is satisfied when the first response was received within the maximum acceptable latency for the first response. In some examples, the one or more criteria include a second criterion that is satisfied when the first response was received after a minimum acceptable latency corresponding to the first duration for solving the computational challenge. For example, the terminal determines whether the first response was received with a latency that is less than or equal to the maximum acceptable latency, and (in some examples) greater than the latency corresponding to the time duration required, by the remote device, for solving the computational challenge (e.g., generating the response). In some examples, the one or more criteria include a third criterion that is satisfied when the first response is successfully authenticated.

At operation 410, the terminal identifies a first action associated with the remote device. In some examples, the first action includes unlocking a vehicle door, starting an engine of a vehicle, opening a trunk hatch of a vehicle, or another action associated with a vehicle that includes the terminal. In some examples, the first action may include processing a payment associated with the remote device. In some examples, the terminal identifies the first action based on receiving the response from the remote device; for example, if the terminal receives a response from the remote device, the terminal identifies an action that is to be performed when the remote device is nearby, such as unlocking vehicle doors. In some examples, the terminal identifies the first action based on receiving a first action request from the device, where the first action request may be separate from the response. For example, the terminal may receive an action request that includes a request to unlock vehicle doors or remotely start the vehicle's engine, such as a request that may be transmitted by the remote device in response to detecting that a user has depressed a button of the remote device.

At operation 412, in accordance with a determination that the first response satisfies the one or more criteria, the terminal causes the first action to be performed. For example, in accordance with a determination that the first response was received within the maximum acceptable latency for the first response, the terminal causes the doors to be unlocked, or the engine to be started, or the payment to be processed, or causes another action to be performed.

At operation 414, in accordance with a determination that the first response does not satisfy the one or more criteria (e.g., the response is not received within the maximum acceptable latency for the first response, or the first response is received before the minimum acceptable latency, or the first response is not successfully authenticated), the terminal refrains from causing the first action to be performed (e.g., does not cause the action to be performed). For example, the terminal ignores an action request received from the remote device by refraining from causing the corresponding action to be performed.

Figure 5:
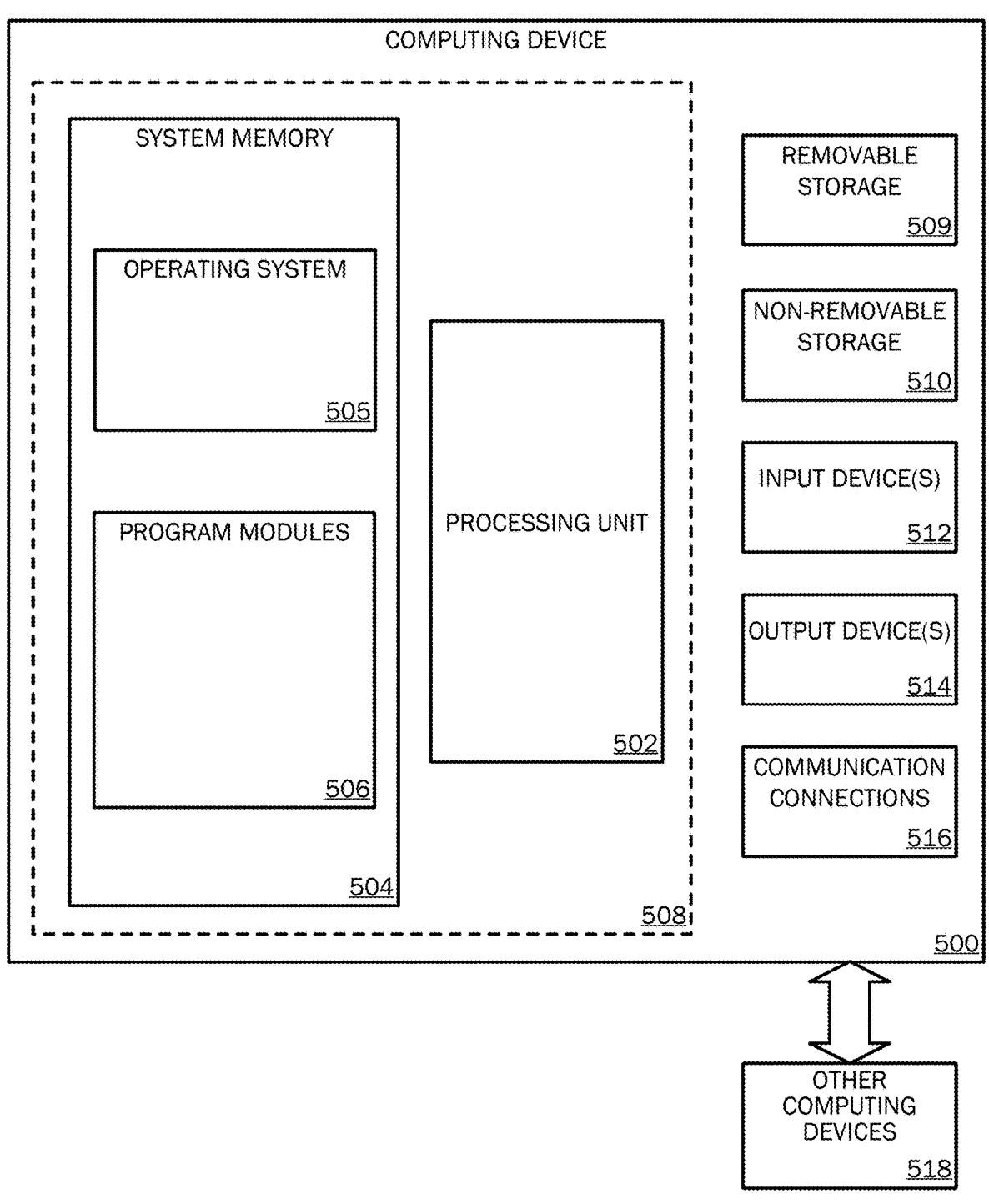
FIG. 5 is a block diagram of an example computing device that can be employed in relation to the present application.

FIG. 5 is a block diagram illustrating physical components (i.e., hardware) of a computing device 500 with which examples of the present disclosure may be practiced. The computing device components described below may be suitable for a computing device(s) implementing (or included in) a remote device 102, a terminal 104, and/or a maximum acceptable latency determination system 202. In a basic configuration, the computing device 500 may include at least one processing unit 502 and a system memory 504. The processing unit(s) (e.g., processors) may be referred to as a processing system. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 550 to implement one or more of the components or systems described above with respect to FIGS. 1-3.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, but not limited to, one or more of the operations of the methods illustrated in FIGS. 1-4. For example, if computing device 500 is included in a terminal, program modules 506 may include one or more modules for dynamically determining a maximum acceptable latency and determining whether a response latency is within the maximum acceptable latency. In some examples, the program modules 506 include a maximum acceptable latency determination system. For example, if computing device 500 is included in a maximum acceptable latency determination system, program modules 506 may include one or more modules for determining a maximum acceptable latency based on configuration settings and/or context information. For example, if computing device 500 is included in a remote device, program modules 506 may include one or more modules for generating (e.g., computing) a response to a received computational challenge. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518 and/or systems (such as devices and/or systems depicted in FIG. 3). Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500 and/or coupled with computing device 500. Computer storage media may be non-transitory and tangible and does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed:

1. A method, comprising:
sending, to a remote device, a computational challenge via radio frequency communication;
receiving a first response to the computational challenge;
dynamically determining a maximum acceptable latency for the first response, wherein the maximum acceptable latency for the first response comprises a first duration associated with the remote device generating the first response and a second duration for propagation of the computational challenge and the first response;
determining whether the first response satisfies criteria, including a first criterion that is satisfied when the first response was received within the maximum acceptable latency for the first response and a second criterion that is satisfied when the first response was received after a minimum acceptable latency corresponding to the first duration for solving the computational challenge;
identifying a first action associated with the remote device;
in accordance with a determination that the first response satisfies the criteria, causing the first action to be performed; and
in accordance with a determination that the first response does not satisfy the criteria, refraining from causing the first action to be performed.

2. The method of claim 1, further comprising:
receiving a first action request from the remote device, wherein the first action is identified based on the first action request.

3. The method of claim 1, wherein the first action is identified based on the first response.

4. The method of claim 1, wherein the criteria include a third criterion that is satisfied when the first response is successfully authenticated.

5. The method of claim 1, wherein dynamically determining the maximum acceptable latency for the first response comprises determining the second duration based on context information.

6. The method of claim 5, wherein the context information comprises a location of an electronic device associated with a registered user, a time of day, a calendar entry associated with the registered user, a usage pattern associated with the remote device, or a combination of these.

7. The method of claim 1, wherein dynamically determining the maximum acceptable latency for the first response comprises dynamically determining the second duration based on a configuration setting of a maximum acceptable distance between a terminal and the remote device.

8. The method of claim 1, wherein dynamically determining the maximum acceptable latency for the first response comprises selecting the second duration based on a current time of day.

9. The method of claim 1, wherein dynamically determining the maximum acceptable latency for the first response comprises retrieving, based on context information, the maximum acceptable latency for the first response, the first duration, the second duration, or a combination of these from a storage element.

10. The method of claim 1, further comprising:
sending, to the remote device, a second computational challenge via radio frequency communication;
receiving a second response to the second computational challenge;
dynamically determining a maximum acceptable latency for the second response, wherein the maximum acceptable latency for the second response is different from the maximum acceptable latency for the first response;
determining whether the second response satisfies one or more second criteria, including a third criterion that is satisfied when the second response is received within the maximum acceptable latency for the second response;
identifying a second action associated with the remote device;
in accordance with a determination that the second response satisfies the one or more second criteria, causing the second action to be performed; and
in accordance with a determination that the second response does not satisfy the one or more second criteria, refraining from causing the second action to be performed.

11. A system, comprising:
at least one processor; and
non-transitory memory, storing instructions that, when executed by the at least one processor, cause the system to perform a method, the method comprising:
sending, to a remote device, a computational challenge via radio frequency communication;
receiving a first response to the computational challenge;
dynamically determining a maximum acceptable latency for the first response, wherein the maximum acceptable latency for the first response comprises a first duration associated with the remote device generating the response and a second duration for propagation of the computational challenge and the first response;

determining whether the first response satisfies criteria, including a first criterion that is satisfied when the first response was received within the maximum acceptable latency for the first response and a second criterion that is satisfied when the first response was received after a minimum acceptable latency corresponding to the first duration for solving the computational challenge;

identifying a first action associated with the remote device;

in accordance with a determination that the first response satisfies the criteria, causing the first action to be performed; and in accordance with a determination that the first response does not satisfy the criteria, refraining from causing the first action to be performed.

12. The system of claim 11, the method further comprising:

receiving a first action request from the remote device, wherein the first action is identified based on the first action request.

13. The system of claim 11, wherein the first action is identified based on the first response.

14. The system of claim 11, wherein the criteria include a third criterion that is satisfied when the first response is successfully authenticated.

15. The system of claim 11, wherein dynamically determining the maximum acceptable latency for the first response comprises determining the second duration based on context information.

16. The system of claim 15, wherein the context information comprises a location of an electronic device associated with a registered user, a time of day, a calendar entry associated with the registered user, a usage pattern associated with the remote device, or a combination of these.

17. The system of claim 11, wherein dynamically determining the maximum acceptable latency for the first response comprises dynamically determining the second duration based on a configuration setting of a maximum acceptable distance between a terminal and the remote device.

18. A method, comprising:

sending, to a remote device, a computational challenge via radio frequency communication;

receiving a response to the computational challenge;

dynamically determining a maximum acceptable latency for the response based on context information;

determining whether the response satisfies criteria, including a first criterion that is satisfied when the response was received within the maximum acceptable latency and a second criterion that is satisfied when the first response was received after a minimum acceptable latency corresponding to the first duration for solving the computational challenge;

identifying an action associated with the remote device;

in accordance with a determination that the response satisfies the criteria, causing the action to be performed; and in accordance with a determination that the response does not satisfy the criteria, refraining from causing the action to be performed.

* * * * *